(12) United States Patent
Rummo

(10) Patent No.: US 9,655,370 B2
(45) Date of Patent: May 23, 2017

(54) PROCESS FOR MANUFACTURING DIES FOR PASTA, THE DIES THEMSELVES, AND THEIR USE IN THE PRODUCTION OF PASTA

(71) Applicant: RUMMO S.p.A., Benevento (IT)

(72) Inventor: Cosimo Rummo, Benevento (IT)

(73) Assignee: RUMMO S.P.A., Benevento (IT)

( * ) Notice: Subject to any disclaimer, the term of this patent is extended or adjusted under 35 U.S.C. 154(b) by 608 days.

(21) Appl. No.: 14/091,525

(22) Filed: Nov. 27, 2013

(65) Prior Publication Data

US 2014/0147567 A1    May 29, 2014

(30) Foreign Application Priority Data

Nov. 29, 2012    (IT) .............................. NA2012A0072

(51) Int. Cl.
| | | |
|---|---|---|
| *B29C 47/12* | (2006.01) | |
| *A21C 11/16* | (2006.01) | |
| *B29C 47/08* | (2006.01) | |
| *A23L 7/109* | (2016.01) | |

(52) U.S. Cl.
CPC .............. *A21C 11/16* (2013.01); *A23L 7/109* (2016.08); *B29C 47/085* (2013.01); *B29C 47/0837* (2013.01); *B29C 47/0852* (2013.01)

(58) Field of Classification Search
CPC ... A21C 11/16; B29C 47/0837; B29C 47/085; B29C 47/0852; B29C 47/20; B29C 47/30
See application file for complete search history.

(56) References Cited

U.S. PATENT DOCUMENTS

| | | | |
|---|---|---|---|
| 3,008,434 A | | 11/1961 | Donato |
| 3,778,520 A | * | 12/1973 | Reinhart et al. ....... A21C 11/00 264/167 |
| 5,089,284 A | | 2/1992 | Irvin et al. |
| 6,413,565 B2 | | 7/2002 | Debbouz et al. |
| 2010/0003360 A1 | | 1/2010 | Ouriev et al. |

FOREIGN PATENT DOCUMENTS

AU          531 167 B2    8/1983

OTHER PUBLICATIONS

Italian Search Report, dated Aug. 23, 2013, from corresponding Italian application.

* cited by examiner

*Primary Examiner* — Yogendra Gupta
*Assistant Examiner* — Joseph Leyson
(74) *Attorney, Agent, or Firm* — Young & Thompson

(57) ABSTRACT

A process for manufacturing a die for pasta, having, inside a body (1) of metal alloy, at least one dough extrusion passage (13) provided with an input section (ta) and an output section (tp) that are concentrically and consecutively arranged in the extrusion direction and are joined in a connection transversal cross-section, has a step of manufacturing the input section (ta) with a material having a low coefficient of friction and the output section (tp), which is cylindrically shaped, with a metal alloy so that the input section (ta) has transversal cross-sections with an area larger than the transversal cross-section area of the output section (tp). The dies themselves, and their use in the production of pasta, are described.

11 Claims, 5 Drawing Sheets

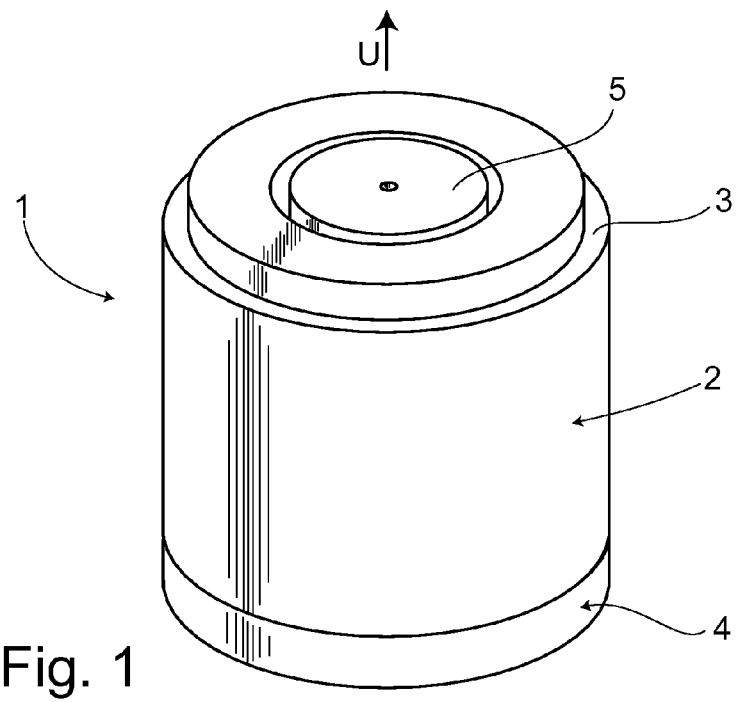

PROCESS FOR MANUFACTURING DIES FOR PASTA, THE DIES THEMSELVES, AND THEIR USE IN THE PRODUCTION OF PASTA

BACKGROUND

1. Technical Field

The present invention relates to a process for manufacturing dies for pasta, the dies themselves, and their use in the production of pasta.

2. Description of Related Art

U.S. Pat. No. 3,008,434 (Maldari), filed on Feb. 3, 1960, aims to provide a generic die for different types of finished products such as pasta, bread sticks, cookies and bakery products, chocolate, candy and other extrudable materials. According to Maldari the die must be able to stand up under long continued use and maintain its proper dimensions under such extended use. The die described by Maldari comprises a holding cup having a circular side wall and a rigid flat bottom wall, a flat disk of Teflon sited on said flat bottom wall in close fitting engagement with said circular side wall and a flat rigid top plate in flat engagement with the upper surface of said disk. The disk of Teflon is held sandwiched between the rigid bottom wall and the rigid upper plate. The top plate, the disk of Teflon and the bottom wall have coaxial extrusion openings, which are respectively downwards flared in the top plate, substantially constant in the disk of Teflon and diverging downwards in the bottom wall. Therefore, the shape of the extrusion passage is convergent/constant/divergent and is the only one claimed by the patent. However, in the description of Maldari, column 2, lines 48-56, one can read that "the holder, which is usually of brass or bronze, may in some instances, as in the illustrated construction, be made to closely match or possibly decrease the size of the die outlet or outlets in the Teflon disk, thus to make the outlet 16 form a gage determining the size of the extruded product and creating a stronger, more compact than if it were extruded simply through the Teflon."

Except that in this passage, Maldari refers only to the introduction of Teflon in a die and gives no indication about the advantages of the combined use of bronze and Teflon in optimizing extrusion of products in general and pasta in particular. In fact, the statement quoted above, which is not reflected either in the claim or in the drawings of the patent, is not even proven by the evolution of the art after the Maldari patent until now. In fact, as well known with particular reference to the pasta, in order to obtain a compact and strong product, it is requested to extrude only through Teflon that is more capable of withstanding high pressures than bronze. On the contrary bronze, in which friction is increased, consequently increases the extrusion temperature which may damage the protein fraction contained in the semolina flour with a result of compromising finished product quality (Walsh et al, 1971; Abecassis et al, 1994).

U.S. Pat. No. 5,089,284 (Irvin) discloses a method of forming pasta through an extruder that is equipped with a die plate having a plurality of holes whose transversal cross-sections decrease in the direction of extrusion. A dough as a mixture of flour rich in gluten and water is extruded through the die plate so that the extruded pasta remains substantially uncooked, i.e. a major portion, greater than about 80 percent by weight of the total starch content, is ungelatinized (i.e., less than about 20 percent gelatinization). Irvin claims heating the die plate to a temperature of at least about 54 degrees Celsius, the die plate having frustoconically shaped holes that are coated with plastic material with a low coefficient of friction until the cross-section of the hole with its smallest value. The shape of the extrusion passage of the die is then frustoconical-cylindrical. It is clear that the aim of Irvin is to leave the surface of the last section of the die orifices not covered with plastic only for allowing the dough to be extruded with direct thermal contact with the die being heated only in the last section, in order to restrict the gelatinization to the outermost "corona" region of the shape. Then Teflon acts as a partial thermal insulator (description of Irvin, column 8, lines 30-52).

U.S. Pat. No. 6,413,565 (Debbouz) aims to provide a superficially not rough pasta with improved organoleptic qualities. Said pasta is obtained by a process of extrusion through a die comprising a plurality of flow passages completely coated with a material with a low coefficient of friction, which for convenience is indicated by way of example as polytetrafluoroethylene or PTFE, commercially known as Teflon by DuPont.

To date, in both industrial and artisanal pasta production provision is made that two materials are used in contact with the product being extruded in the terminal step of extrusion:
  only Teflon extruding surface;
  only bronze extruding surface.

In the following strengths and weaknesses related to the exclusive use of either material are described. Then, the present invention will be disclosed that, by combining Teflon and bronze in sequence within each singular die in the extruding surface, achieves a prefixed object.

Strengths of the use of Teflon in the extrusion with respect to bronze:
  Teflon gives the pasta a smooth and shiny appearance and prevents heat stress to the product, thanks to less friction, thus enhancing also raw materials used;
  the resulting pasta has higher toughness and more chewing resistance;
  Teflon allows higher speed of work and higher resistance to pressure;
  less wear.

Weaknesses of the use of Teflon in the extrusion with respect to bronze:
  industrial perception of the final color of the product;
  greater appearance of small imperfections in the product (white and black dots etc.).
  greater appearance of any difference in color (lighter or darker);
  less enhanced sauces;

Strengths of the use of bronze in the extrusion with respect to Teflon:
  pasta takes on a roughness and a porosity that allow pasta to retain sauces at the best and enhance flavors;
  more artisanal appearance of the product that is appreciated by consumers.

Weaknesses of the use of bronze in the extrusion with respect to Teflon:
  pasta has less toughness and lower chewing resistance;
  high friction during extrusion and greater risk of thermal damage of the raw material used, starch gelatinization, protein denaturation (Dexter et al, 1971);
  excessive release of dust in suspension, in both pasta production step and packaging step, which can gives rise to insect problems.

SUMMARY

The present invention, by using the above described materials, i.e. Teflon-bronze, in sequence on the extruding surface within the same die, allows the strengths of bronze extrusion to be combined with those of the Teflon extrusion. Basically, by putting a Teflon section immediately before a bronze section in the same pasta extrusion die toward the exit direction, a final product with excellent toughness and chewing resistance equal to a Teflon extruded product has achieved; at the same time a suitable roughness is given to the pasta with the bronze final section with a result of enhancing the ability to retain sauces and flavors.

A main object of the present invention is to provide a pasta extrusion die that is easy to be manufactured and inexpensive.

Another object of the invention is to create extrusion passages in the die that give the dough desired optimal features.

In particular, an object of the present invention is to provide an extrusion process that uses the die according to the invention for obtaining an industrial Teflon extruded pasta which has the appearance of a bronze extruded pasta. More in particular, the invention achieves a mat rough outer surface on the pasta like a sort of "sandblasting". Thus the product obtained has a distinctive external appearance similar to that of bronze extruded pasta but the toughness of the typical Teflon extruded pasta.

More generally, the purpose of the invention is to give a pasta all the positive features related to the Teflon normal extrusion, while maintaining the rough appearance given by the bronze extrusion, or to obtain the advantages of the Teflon extrusion and the advantages of the bronze extrusion, so that the pasta is tough, chewing resistant, optimal in the double cooking, thanks to Teflon, but at the same time able to retain excellently every kind of sauces with its rough surface, thanks to bronze.

Therefore, the objects specified are substantially achieved, in a first aspect of the invention, by a process of manufacturing dies for pasta and, in a second aspect of the invention, by the dies thus obtained comprising the technical features set forth in one or more of the appended claims.

In a third aspect of the invention, it provides the use of such a die in a process for producing pasta according to the appended claim.

In using said dies the pasta is given the toughness features similar to a Teflon extruded product, and the advantages in terms of great retention of the sauces resulting from the roughness, in practice the cooked pasta is al dente and has great flavor.

It should be appreciated that the described results have been reached after a considerable effort in an attempt to achieve a compromise to obtain a pasta that has simultaneously both the advantages from a material having a low coefficient of friction, and the advantages of bronze. Alternatively titanium and other metal alloys can be used.

BRIEF DESCRIPTION OF THE DRAWINGS

Further characteristics and advantages of the present invention will become more apparent from the indicative, and therefore non-limiting, description of embodiments of a die, as illustrated in the accompanying drawings in which:

FIG. 1 is an isometric view of a die according to the invention designed for the extrusion of a short-cut pasta such as macaroni;

FIG. 2 is an axial longitudinal cross-section of the die in FIG. 1;

DETAILED DESCRIPTION

Figure 3:
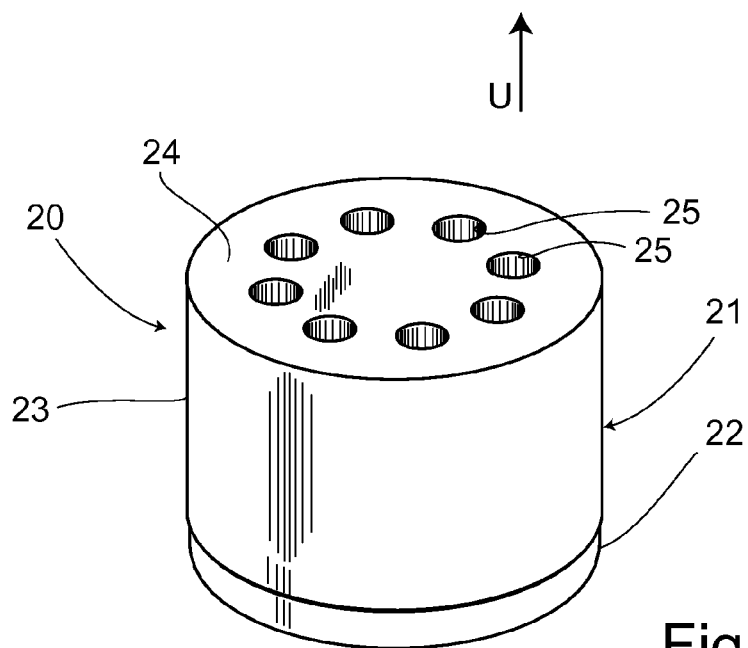
FIG. 3 is an isometric view of a die according to the invention designed for the extrusion of a long pasta such as spaghetti.

Referring to the figures, three embodiments of a die according to the invention, which are taken as an example for a short-cut and long pasta respectively, are described. It is obvious that different dies, still falling within the present invention, may be provided for different shapes of pasta. For example, for obtaining a short-cut pasta die shapes can be pierced with circular through cross-sections (e.g. pens, rigatoni, small thimbles), or other than circular cross-section, and slotted shapes (e.g. fusilli and shells); for long pasta die shapes can be round with circular through cross-sections (e.g. spaghetti) or other than circular cross-section (e.g. spaghetti alla chitarra), flat (e.g. little tongues and little slices), pierced (e.g. little tongues and zite) ribbed-pierced and ribboned (e.g. mafalde and tripoline).

By die it is meant, generally, a matrix having at least one extrusion passage of a given length for obtaining the extrusion of a dough from an output cross-section. The die can be an insert, made of a metal alloy, such as bronze, titanium alloys, or other alloys, to be inserted, together with a multiplicity of other equal, in an extruder plate, so called "massello", of an extruder station for pasta.

In particular shown in FIGS. 1 and 2 are an isometric view and an axial longitudinal cross-section, respectively, of a die according to the invention that is designed for the extrusion of a short-cut pasta such as macaroni. The die 1 has a body 2 of substantially cylindrical shape that in FIGS. 1 and 2 is disposed in an extrusion direction upwards of the page as denoted by arrows E, E indicating the input of the dough to be extruded and by an arrow U indicating the output from the die itself. It should be understood that the die is shown upside down with respect to its position of use only for the purpose of giving a more complete representation.

First referring to FIG. 1, indicated as 3 in the body 2 is a recess that serves as an abutment in the extrusion plate or "massello" (not shown). Indicated as 4 is a die core that will be better described with reference to FIG. 2, ending at the top with a cap 5 of a mushroom-shaped portion of the die core 4. With reference to FIG. 2, the body 2 has a side wall 6 terminating, upward in the page, with a annulus being indicated as 7. The side wall 6 and the annulus 7 constitute a housing for an outer hollow cylindrical portion 8 of the plastic material having a low friction coefficient hereinafter generically called Teflon. The outer hollow cylindrical portion 8, which may also be a frustoconical, is retained in position by a retaining ring 9 that is fixed on the inner surface of the side wall 6 and having a frustoconical shape at the bottom.

The body 2 is closed at the front, in the direction of extrusion, by the die core 4 comprising a perforated base 10 supporting the mushroom portion terminating in the rear with the cap 5. The perforated base 10 has longitudinal equispaced through holes; the through holes that are visible in FIG. 2 are indicated as 14 and 15. The connection between the body 2 and the die core 4 is made with a male-female coupling 16 near the perforated base 10. The mushroom-shaped portion of the die core 4 has a stem 11 that is surrounded peripherally by a hollow inner cylindrical portion 12 of Teflon arranged concentrically to the outer hollow cylindrical portion 8. The latter is accommodated between the side wall 6, the annulus 7 and the retaining ring 9. The stem 11, which can also be frustoconical, after the insertion of the inner hollow cylindrical portion 12, is concentrically coupled with light drive fit by a central pin 17 integral with the base 10 of the die core 4. In the coupling portion the central pin 17 has a frustoconical shape 18 that is useful to retain accurately the inner hollow cylindrical portion 12 of Teflon. Formed between the inner hollow cylindrical portion 12 and the outer hollow cylindrical portion 8 is an extrusion passage 13 comprising concentrically in the extrusion direction an input section having a height ta, which is then called, in the following, input section ta having a width pct, and an output section having a height tp, which is called, in the following, output section tp having a width pcb. The width pcb of the output section tp is always less than the width pct of the input section ta. The output section tp is situated between the input section ta and the output section of the die. According to the embodiment shown in FIGS. 1 and 2, the extrusion passage 13 is delimited, as mentioned above, in the input section ta by Teflon that is shaped in the outer and inner hollow cylindrical portions 8 and 12 respectively, and in the output section tp by the metal alloy of the die in the facing portions of the annulus 7 and of the cap 5 of the concentric mushroom-shaped portion of the die core 4. Therefore, in detail the cylindrical extrusion passage 13 has a transversal cross-section in the shape of an annulus having two different areas, as formed in the outlet section is a step that reduces the passage section. A transition zone including the passage section between the input section ta and the output section tp could also be slightly bevelled. In a die for short-cut pasta according to the invention, the output section tp has e.g. a length between 10 and 40 percent of a length lc of the extrusion passage that is the sum of the length of input section to and output section tp as defined above. Situated upstream of the extrusion passage is a conventional compression chamber 19 where the dough flows that advances thanks to the operating pressure through the extrusion passage 13.

It can be seen from the foregoing that a die is made that allows the production of pasta to be obtained by modifying only the surface of the extrusion passage. The intended object has been reached by providing a cylindrical extrusion passage having an annulus-shaped transversal cross-section that is delimited, both internally and externally, in a input section by Teflon and in a very limited output section by the metallic alloy. By using a die according to the present invention in a process of pasta production, the pasta is given a matt surface that is typical of the bronze artisanal working, while maintaining the industrial features of strength and toughness of a product manufactured with the known current techniques of Teflon fast extrusion. A compromise has been reached with Teflon in the input section of the die and bronze or other alloys in the output section that improves directly form and final geometry of the pasta shape.

Figure 4:
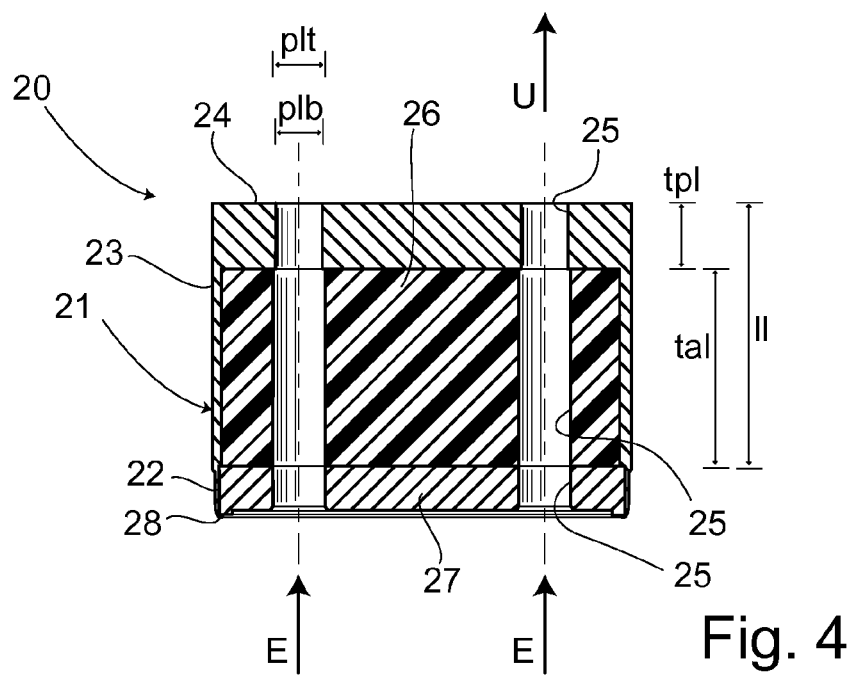
FIG. 4 is an axial longitudinal cross-section of the die in FIG. 3.

The features set forth above apply to all types of dies, and then also to dies for long pasta of which a description of an embodiment is given here below. Reference is made now to FIGS. 3 and 4 which are an isometric view and an axial longitudinal cross-section respectively, of a die according to the invention designed for the extrusion of a shape of long pasta such as spaghetti.

Indicated as 20 in FIGS. 3 and 4 is a die having a cylindrical body 21 preferably made of metal alloy, such as bronze, with a side wall 23 terminating at an input base with a narrowing 22 and an output wall 24 in the direction of extrusion as indicated by the input arrows E, E and output arrow U. The output wall 24 has a plurality of holes 25 from which an insert 26 made of Teflon can be seen inside the cylindrical body 21. Further in the insert 26, a plurality of holes being denoted also as 25 are arranged concentrically to the holes 25 of the output wall 24. In the opposite side to the output wall 24 there is a plate 27 of metal alloy that is also perforated with holes 25 corresponding to the holes 25 of the outlet wall 24.

The plate 27 is retained by the narrowing 22 at the input base of the cylindrical surface 23 also thanks to an overlap 28 created on the same input base. It should be understood that in the insert represented by the die in FIGS. 3 and 4 each hole or extrusion cylindrical passage 25 has a circular transversal cross-section. The input section tal of each cylindrical passage 25 is delimited on its lateral surface by the material having a low coefficient of friction, and its output section tpl is delimited on its lateral surface by the metal alloy. According to the invention the input section tal has holes having a diameter plt being greater than the diameter plb of the holes of the output section tpl. The transition zone downstream of the connection transversal cross-section between the input section tal and the output section tpl could also be slightly bevelled. Preferably, the output section tpl has a length between 0.5 and 35 percent of the length of the extrusion passage indicated as ll.

The above describe die used for extruding long pasta demonstrated to be able to produce spaghetti with optimal roughness, so that in practice the product is aesthetically similar to that exclusively bronze extruded, even if said product has inside a toughness equal to traditional polished product, as verified by sensory and instrumental testing.

Figure 5:
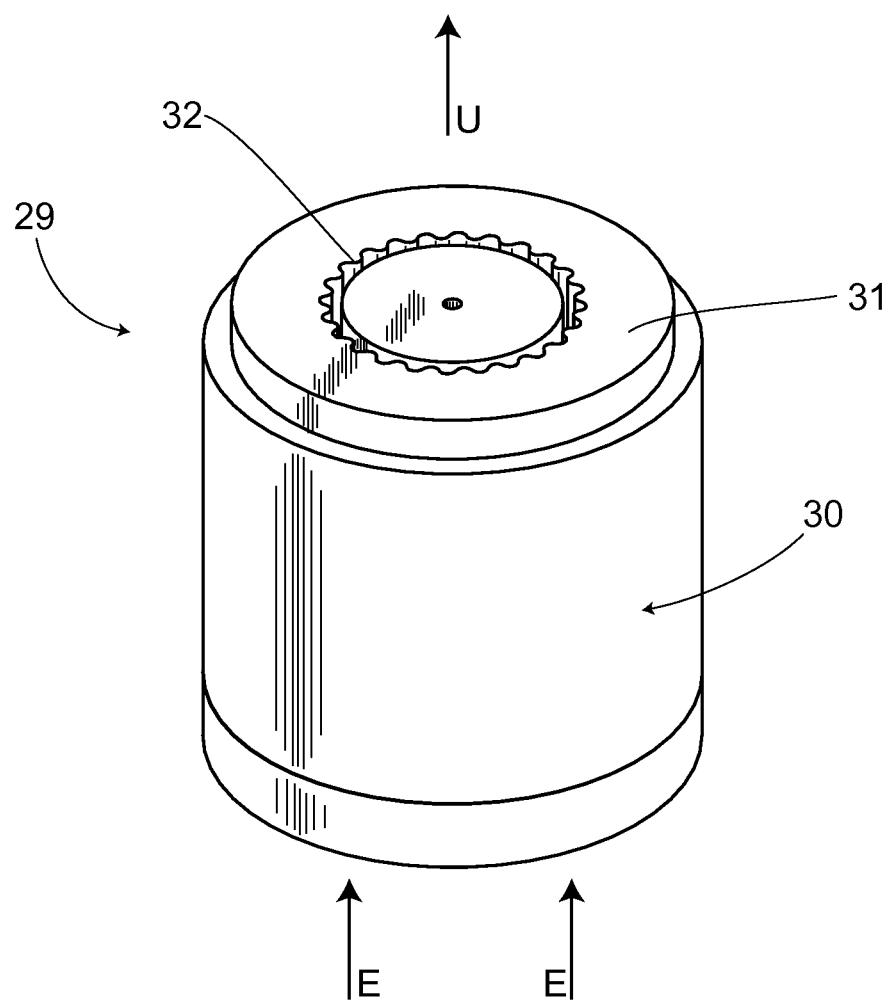
FIG. 5 is an isometric view of a die similar to that in FIG. 1 designed for the extrusion of ribbed short-cut pasta.

Referring now to FIG. 5, there is shown an isometric view of a die according to the invention designed for the extrusion of a shape of ribbed short-cut pasta. The die 29 has a body 30 of substantially cylindrical shape similar to that in FIG. 1. A difference consist of a knurl 32 in the output section tp on the internal surface of the annulus 31 of the body 30.

Figure 6:
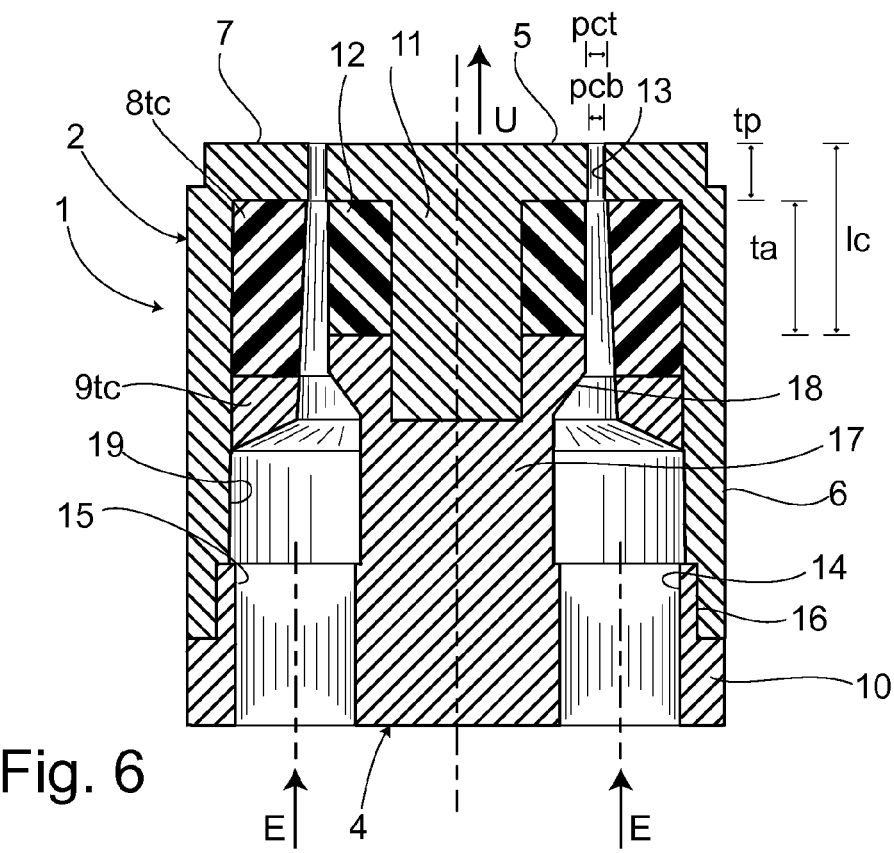
FIG. 6 is an axial longitudinal cross-section of a variant of the die similar to that in FIG. 2.
Figure 7:
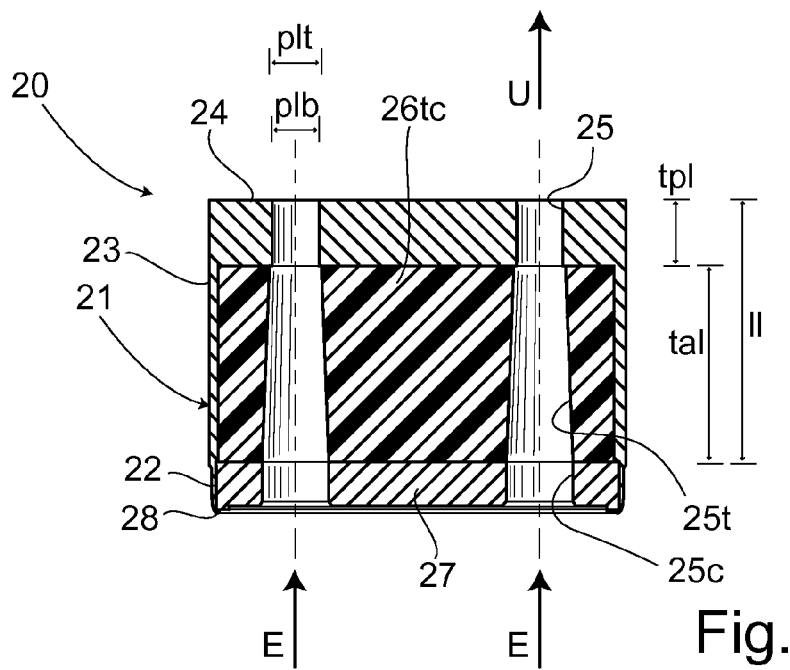
FIG. 7 is an axial longitudinal cross-section of a variant of the die similar to that in FIG. 4.

In the above description embodiments of the die according to the invention have been disclosed as having substantially cylindrical extrusion passages. However, depending on the shapes of pasta provision can be made of dies for both short-cut and long pasta which have a cylindrical output section tp, tpl and a frustoconical input section ta and tal respectively. In this regard reference is made to FIGS. 6 and 7, which are axial longitudinal cross-sections of two variants of a die similar to those in FIG. 2 for short-cut pasta and in FIG. 4, respectively, for long pasta. In FIGS. 6 and 7 the same reference numerals in FIGS. 2 and 4 have been used, except for different parts.

In FIG. 6 a frustoconical outer portion being indicated as 8tc is made of Teflon so that the extrusion passage has a tapered shape on its outer side. Consequently, the outer retaining ring 9tc has been lightened as compared with the first embodiment.

Indicated as 25t in FIG. 7 are frustoconical holes 25t that are formed in the insert 26 made of Teflon inside the cylindrical body 21. The holes 25t are concentric with the holes 25 of the output wall 24 and with the holes 25c of the plate 27 of metal alloy, that are frustoconical like the holes 25t in the insert 26tc of Teflon.

Figure 8:
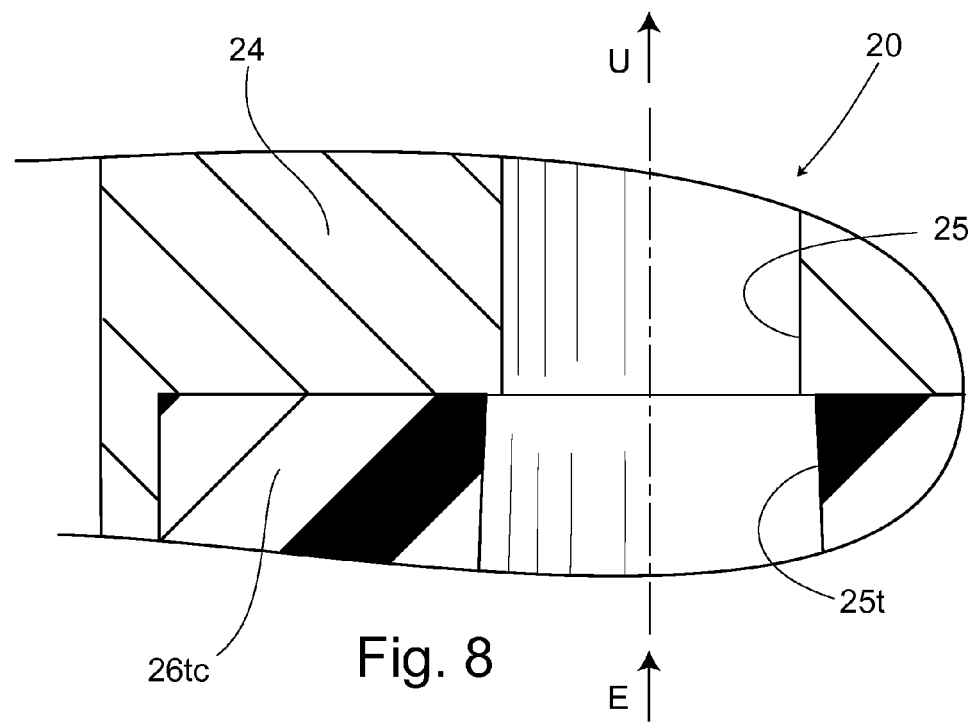
FIG. 8 is an enlarged detail in FIG. 7.
Figure 9:
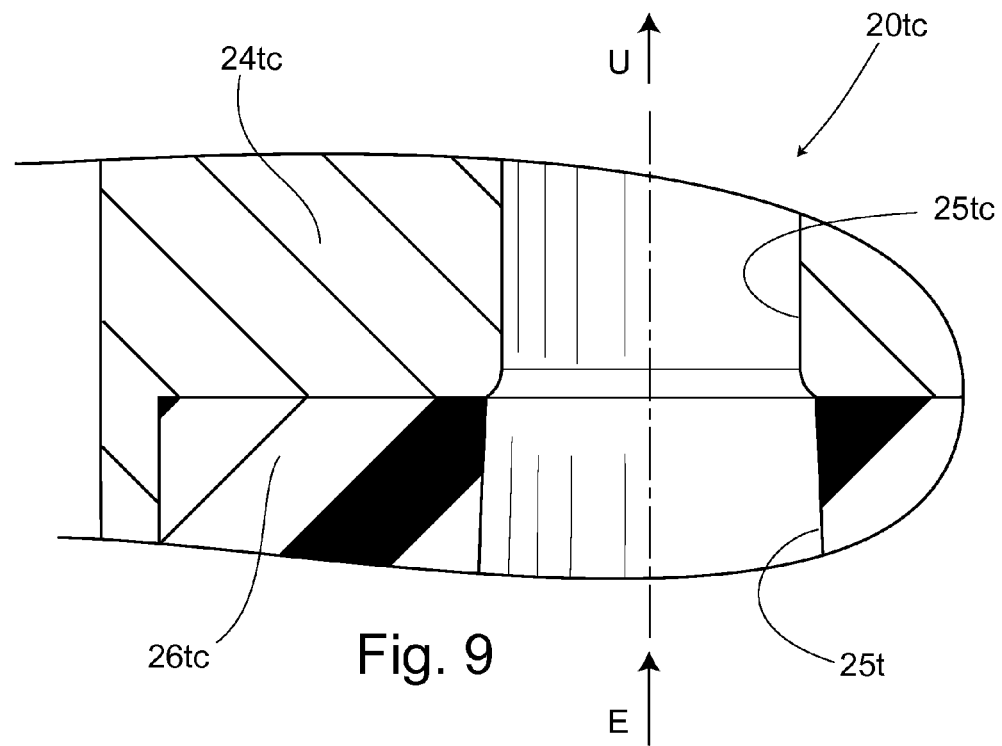
FIG. 9 is an enlarged detail in FIG. 7 in a different embodiment.

In FIGS. 8 and 9 an enlarged detail of FIG. 7 and a variant respectively, are shown.

By way of example, reference is made to the die represented in FIG. 7 for showing in enlarged scale a transversal cross-section connecting the input section of Teflon and the output section of metal alloy. The die 20 of FIG. 7 is represented partially in FIG. 8: there is shown an extrusion hole 25 in the output wall 24 of metal alloy as an extension of the input hole 25*t* concentrically made in the insert 26*tc* of Teflon or other material with a low coefficient of friction: the transition around the transversal cross-section connecting the two sections is step-shaped. In the variant of FIG. 9 the transition in the concentric holes 25*t* in the insert 26*tc* of Teflon, and 25*tc* in the output wall 24*tc* of metal alloy around said connection transversal cross-section is tapered as an inclined plane. Said taper can be both straight and curved. The choice of the one or the other form of transition around said connection transversal cross-section depends on the desired shapes of pasta.

It should be understood that, despite having described the process for manufacturing dies according to the invention by giving only a few examples of dies, also other dies with different dimensions constructed with the same process are included in the invention as defined in the appended claims.

What is claimed is:

1. A process for manufacturing dies for pasta comprising: forming at least one dough extrusion passage inside a body of a metal alloy, the dough extrusion passage being formed having an input section and an output section that are concentrically and consecutively arranged in the extrusion direction and joined in a connection transversal cross-section, the input section being made with a material having a low coefficient of friction and the output section, which is cylindrically shaped, being made with a metal alloy so that the input section has transversal cross-sections with an area larger than the transversal cross-section area of the output section, the output section having a length between 10-40% of the given length of the extrusion passage.

2. The process according to claim 1, further comprising forming a step in the output section in correspondence to a transition section downstream said connection transversal cross-section.

3. The process according to claim 1, further comprising forming a taper in the output section in correspondence to a transition section downstream said connection transversal cross-section.

4. A pasta die consisting of:
a metal alloy body having at least one extrusion passage of a given length for extruding a dough from an output cross-section of the die, the extrusion passage comprising an input section and an output section that are concentrically and consecutively arranged in an extrusion direction, said at least one extrusion passage being delimited in said input section by a material having a low coefficient of friction and in said output section, which is cylindrically shaped, by a metal alloy having a transversal cross-section area lower than each transversal cross-section area of the input section, the output section having a length between 10-40% of the given length of the extrusion passage.

5. The pasta die according to claim 4, wherein each extrusion passage has a transversal cross-section in the shape of an annulus, the input section of the extrusion passage is delimited over both the inner side surface and the outer side surface by the material having a low coefficient of friction, and the output section of the extrusion passage is delimited over both the inner side surface and the outer side surface by the metal alloy.

6. The pasta die according to claim 5, wherein the output section of the extrusion passage has a knurl over its outer side surface.

7. The pasta die according to claim 4, wherein each extrusion passage has a circular transversal cross-section, the input section of the extrusion passage is delimited on its side surface by the material having a low coefficient of friction, and the output section of the extrusion passage is delimited on its side surface by the metal alloy.

8. The pasta die according to claim 4, wherein said input section is cylindrical.

9. The pasta die according to claim 4, wherein said input section is frustoconical.

10. The pasta die according to claim 1, wherein the material having a reduced coefficient of friction is polytetrafluoroethylene (PTFE).

11. The pasta die according to claim 4, wherein the transition around the transversal cross-section connecting the input section and the output section is step-shaped or tapered as a straight or curved inclined plane.

* * * * *